(12) United States Patent
Olenzek et al.

(10) Patent No.: US 7,827,786 B2
(45) Date of Patent: Nov. 9, 2010

(54) SEAL ASSEMBLY FOR REDUCING FLUID LOSS FROM TRANSMISSION PUMP

(75) Inventors: Richard F. Olenzek, Farmington Hills, MI (US); Steven A. Coleman, Westland, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 361 days.

(21) Appl. No.: 12/038,073

(22) Filed: Feb. 27, 2008

(65) Prior Publication Data

US 2008/0289926 A1   Nov. 27, 2008

Related U.S. Application Data

(60) Provisional application No. 60/939,916, filed on May 24, 2007.

(51) Int. Cl.
*F16D 31/02*   (2006.01)
(52) U.S. Cl. ...................................................... 60/358
(58) Field of Classification Search .................. 60/330, 60/358; 277/402, 562
See application file for complete search history.

(56) References Cited

U.S. PATENT DOCUMENTS

| | | | | |
|---|---|---|---|---|
| 2,932,535 | A * | 4/1960 | Peickii et al. | 277/560 |
| 3,443,814 | A * | 5/1969 | Dahlheimer | 277/552 |
| 4,613,143 | A * | 9/1986 | Butler | 277/569 |
| RE33,192 | E * | 4/1990 | Bainard et al. | 277/565 |
| 5,398,942 | A * | 3/1995 | Duckwall et al. | 277/402 |
| 5,501,469 | A * | 3/1996 | Ducugnon et al. | 277/551 |
| 6,196,551 | B1 * | 3/2001 | Zellers | 60/330 |
| 7,516,612 | B2 * | 4/2009 | Schoenek | 60/330 |

* cited by examiner

*Primary Examiner*—Michael Leslie
(74) *Attorney, Agent, or Firm*—Quinn Law Group, PLLC

(57) ABSTRACT

An improved seal assembly is provided that minimizes loss of transmission pump pressure by controlling fluid flow past a torque converter hub bushing to meet bushing lubrication requirements without unnecessarily diminishing pump pressure and while also minimizing frictional losses. The seal assembly includes a rigid carrier adapted to fit between a pump body member and the torque converter hub. An elastomeric lip extends from the rigid carrier. A contact layer is connected to the elastomeric lip and configured to sealingly contact the torque converter hub. The contact layer is integral with and harder than the elastomeric lip, therefore minimizing frictional losses.

12 Claims, 3 Drawing Sheets

SEAL ASSEMBLY FOR REDUCING FLUID LOSS FROM TRANSMISSION PUMP

CROSS-REFERENCE TO RELATED APPLICATIONS

This application claims the benefit of U.S. Provisional Application No. 60/939,916 filed May 24, 2007, which is hereby incorporated by reference in its entirety.

TECHNICAL FIELD

The invention relates to a seal assembly for a transmission pump.

BACKGROUND OF THE INVENTION

Hydraulic transmission pumps are typically powered by a hub attached to a torque converter which in turn is driven by engine output. A bushing is positioned between the torque converter hub and a stationary body member of the pump to permit relative rotation of the torque converter hub. The transmission pump provides pressurized fluid to meet the cooling, lubrication, and clutch apply pressure requirements of the transmission. Loss of pump pressure through leakage reduces the efficiency of the transmission. Pump seals are typically provided to maintain pump pressure. The bushing must be lubricated, so some of the pressurized fluid is typically directed through a gap between the bushing and the torque converter hub. A seal assembly is typically provided at the side of the bushing opposite the pump to prevent escape of the transmission fluid outside of the transmission.

SUMMARY OF THE INVENTION

An improved seal assembly is provided that: minimizes loss of transmission pump pressure by controlling fluid flow past the torque converter hub bushing to satisfy bushing lubrication requirements without allowing excess fluid flow that unnecessarily diminishes pump pressure, while also minimizing frictional losses and reducing assembly time and error. The seal assembly includes a rigid carrier adapted to fit between the pump body member and the torque converter hub. An elastomeric lip extends from the rigid carrier. A contact layer is connected to the elastomeric lip and is configured to sealingly contact the torque converter hub. The contact layer is harder than the elastomeric lip, and therefore reduces friction losses at the rotating torque converter hub. Notably, the elastomeric lip and contact layer are integrally connected with the rigid carrier, whether by overmolding, adhesion, or other known methods, and there is thus no frictional loss between the lip and the rigid carrier. The rigid carrier has an orifice positioned in fluid connection with the gap and sized to control (i.e., minimize) the flow of fluid from the pump cavity through the gap, to minimize pump pressure loss. The rigid carrier also has vent openings that permit fluid that has flowed through the orifice to return to a sump. Preferably, a seal member such as another elastomeric lip or an O-ring is operatively connected to the rigid carrier to sealingly contact the pump body member, thus partially defining a pressurized cavity on a side of the rigid carrier adjacent the bushing, upstream of the orifice.

A torque converter assembly is provided that includes the torque converter hub, the pump, the bushing and the seal assembly described above.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
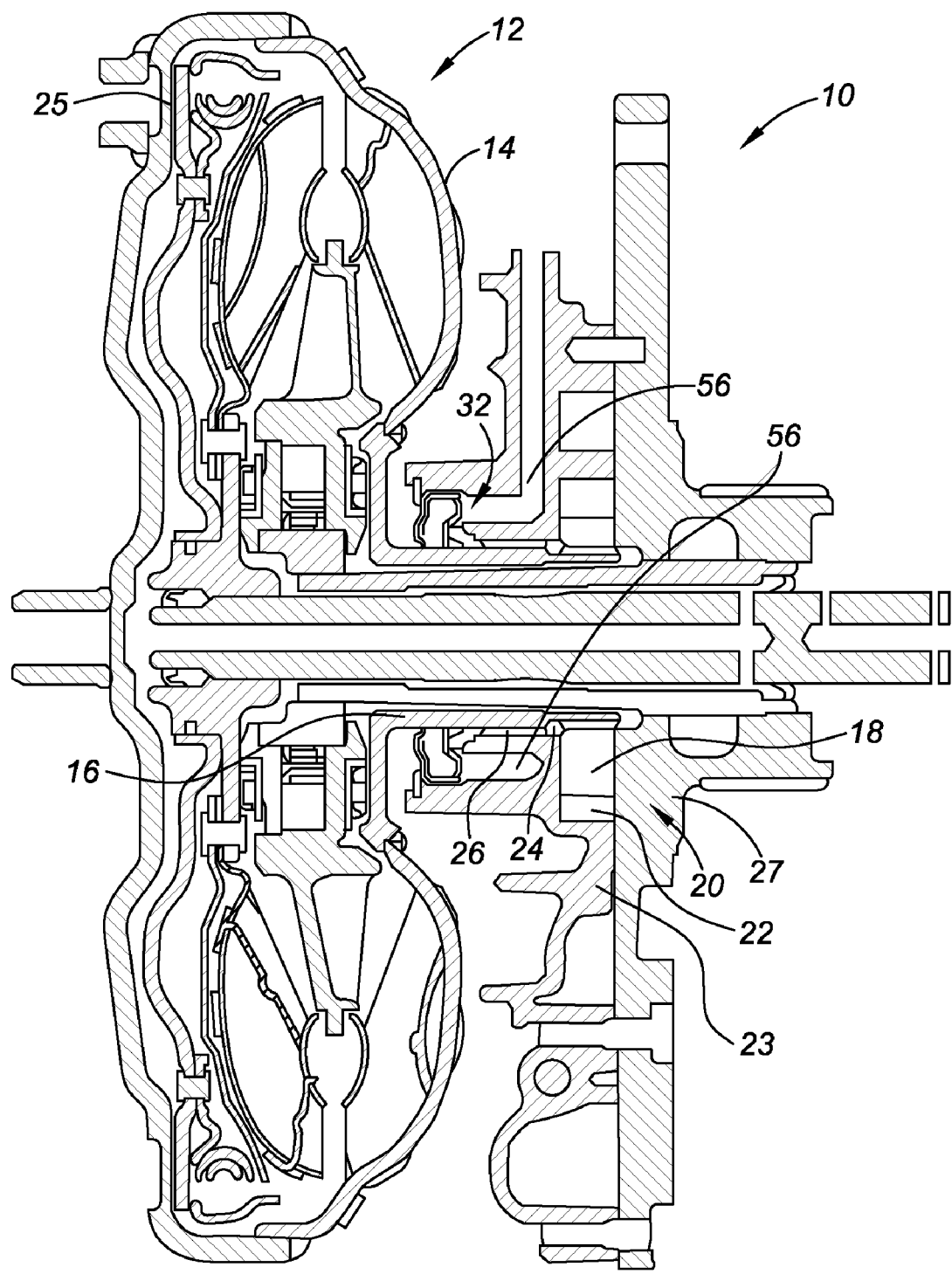
FIG. 1 is a schematic illustration in fragmentary, partially cross-sectional view of a transmission having a torque converter assembly and a pump seal assembly.

Referring to FIG. 1, a transmission 10 includes a torque converter assembly 12 with a rotor 14 driven by an engine or other power source (not shown) and a torque converter hub 16 connected for rotation with the rotor 14, as is known. The torque converter hub 16 drivingly engages a pump gear 18 of a transmission pump 20 to pressurize fluid which is transferred from discharge pump cavity 22, partially defined by a stationary pump body member 23, to various components of the transmission 10 to meet hydraulic power requirements. A cavity 24 is primarily filled from oil transfer channels in the pump 20 that provide controlled supply pressure to a torque converter clutch 25 or, when the torque converter clutch 25 is off, lubrication flow and pressure. The cavity 24 can also fill with pressurized fluid leakage past the pump gear 18. A bushing 26 is press fit between the pump body member 23 and the torque converter hub 16 to permit rotation of the torque converter hub 16 relative to the pump body member 23. A pump cover 27 is secured to the pump body member 23 to close the pump 18. As better viewed in FIG. 2, a clearance gap 28 is maintained between the torque converter hub 16 and the bushing 26 to permit lubrication and cooling of the bushing 26. The gap 28 extends the axial length of the bushing 26 and permits flow of the pressurized fluid from cavity 24 to a cavity 30 at the other end of the bushing 26.

Figure 2:
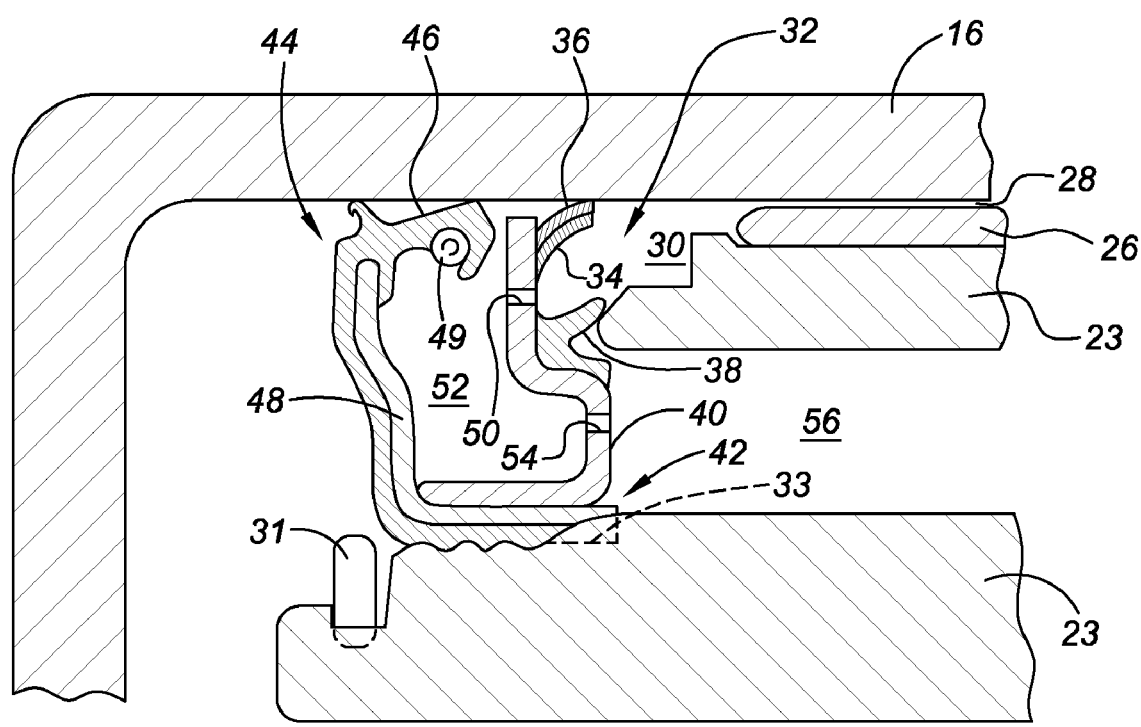
FIG. 2 is a schematic illustration in fragmentary, partially cross-sectional view of the pump seal assembly of FIG. 1 having an elastomeric lip with a contact layer, an elastomeric seal member, and an orifice through a carrier member.

Referring to FIG. 2, a transmission pump seal assembly 32 is positioned adjacent the cavity 30 and partially defines as well as seals the cavity 30. The seal assembly 32 is configured to fit over the pump body member 23, with a snap ring 31 maintaining its axial position, and preferably nests within recesses 33 formed in the pump body member 23. The seal assembly 32 controls the fluid flow past the bushing 26 to meet bushing lubrication and cooling requirements while minimizing or eliminating excess fluid flow and associated hydrodynamic energy loss due to wasted pressurized fluid. Specifically, the seal assembly 32 includes an elastomeric lip 34 with contact layer 36, a seal member 38 supported on a first carrier member 40 of a rigid annular carrier 42, a lip seal assembly 44 including a lip seal 46 extending from a second carrier member 48 of the carrier 42 and a biasing member 49. The transmission pump seal assembly 32 controls pressure at cavity 30 by controlling the fluid flow from the cavity 30 through a control orifice 50 through the first carrier member 40 to another cavity 52 defined by the seal assembly 32 from which the fluid vents through multiple circumferentially-spaced vent openings 54 (one shown), through a passage 56 defined in the pump body member 23 to a fluid sump (not shown). As is evident in FIG. 1, the passage 56 has a circumferential portion adjacent the seal assembly 32 as well as a radial portion that vents the circumferential portion to the sump.

The characteristics of each of the components of the seal assembly 32 and their functional cooperation to reduce pump pressure loss, minimize frictional loss, and improve assembly time and reliability are now described in greater detail. The first carrier member 40 and the second carrier member 48 are preferably a rigid material such as stamped steel or plastic. The elastomeric lip 34, the lip seal 46 and the seal member 38 are preferably all of a rubber of similar material molded-over or otherwise applied or adhered to the respective carrier members 40, 48, as is known in the art.

The contact layer 36 is applied at a radially outer surface of the elastomeric lip 34 such that it is positioned for sealing contact with the torque converter hub 16. The contact layer 36 is of a harder material than the elastomeric lip 34 so that friction with the rotating torque converter hub 16 is less than if the more compliant elastomeric lip 34 directly contacted the torque converter hub 16. Preferably, the contact layer 36 is polytetrafluoroethylene (PTFE). A preferred PTFE material for the contact layer is 15% glass filled having a durometer hardness of 98 (A scale) and a tensile strength of 13.8 MPa. Additionally, because the contact layer 36 is integrally secured to the lip 34, which in turn is integrally secured to the first carrier member 40, there is no relative rotation or frictional loss between the lip 34, contact layer 36 and first carrier member 40.

Figure 3:
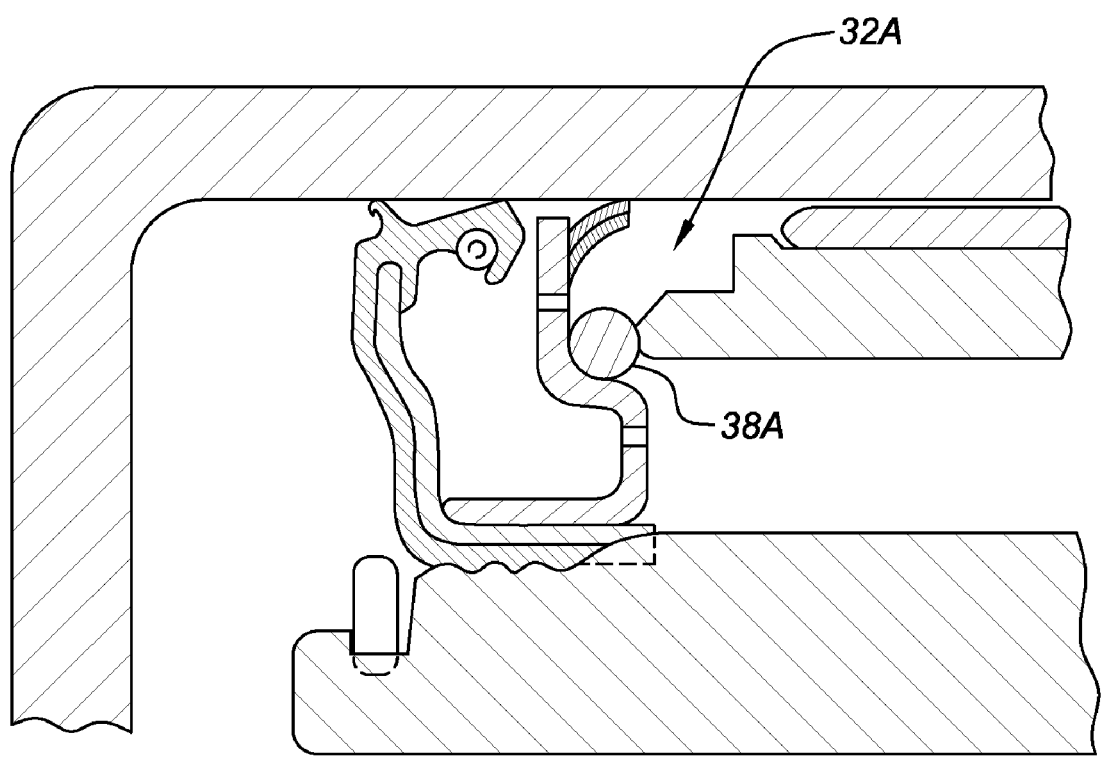
FIG. 3 is a schematic illustration in fragmentary, partially cross-sectional view of an alternative pump seal assembly for use in the transmission of FIG. 1 having an O-ring for the seal member in lieu of the elastomeric seal member of FIG. 2.

The annular seal member 38 may be a molded-over lip seal as shown in FIG. 2. Alternatively, the seal member may be an annular O-ring 38A, as shown in the embodiment of the pump seal assembly 32A of FIG. 3. The remaining components of the pump seal assembly 32A are identical to those of the lip seal assembly 44 of FIG. 2.

The lip seal assembly 44 includes the lip seal 46, which is preferably molded-over rubber on the second carrier member 48. The biasing member 49 is preferably a garter spring that is tucked inward of the lip seal 46 and biases the lip seal 46 radially-outward, into sealing contact with the torque converter hub 16.

To assemble the seal assembly 32 and then install it in the transmission 10, the lip 34, lip seal 46 and seal member 38 are first molded to the respective carrier members 40, 48. The contact layer 36 is then applied to the lip 34 by any known technique. The first carrier member 40 is then press fit over the second carrier member 48. The biasing member 49 is tucked under the lip seal 46. The assembled seal assembly 32 is thus a unitary module, reducing assembly time for installation on the torque converter hub 16 in comparison with seal assemblies that are multiple independent components.

The assembled pump seal assembly 32 is then press fit over the pump body member 23 and positioned axially until the seal member 38 contacts the pump body member 23 adjacent the passage 56. Finally, the torque converter hub 16 is piloted over the seal assembly 32 and bushing 26. Because the contact layer 36 is relatively hard, there is less chance for damage to the lip 34 than if the elastomeric material of the lip 34 directly contacted the torque converter hub as the torque converter hub 16 is piloted over the seal assembly 32. As the torque converter hub 16 slides past the lip seal 46, the biasing member 49 compresses radially inward to allow clearance while maintaining radially outward force sufficient to sealingly contact the lip seal 46 with the torque converter hub 16.

Once installed, the pump seal assembly 32 seals off and defines the cavity 30 as well as the seal cavity 52. The only outlet for the cavity 30 is through the orifice 50 to the seal cavity 52. The size of the orifice 50 and the size of the vent openings 54 determine the steady state fluid pressure in the cavity 30 and seal cavity 52, and control the rate of fluid flow therethrough, thus controlling the pressure and flow rate of the fluid upstream through the gap 28.

While the best modes for carrying out the invention have been described in detail, those familiar with the art to which this invention relates will recognize various alternative designs and embodiments for practicing the invention within the scope of the appended claims.

The invention claimed is:

1. A seal assembly for a transmission pump; wherein the transmission pump has a pump body member partially defining a pump cavity, is operatively connected for rotation with a torque converter hub to pressurize fluid within the pump cavity, and has a bushing defining a gap between the pump body member and the torque converter hub to allow lubrication of the bushing with the pressurized fluid, the seal assembly comprising:
   a rigid carrier positionable between the pump body member and the torque converter hub;
   an elastomeric lip extending from the rigid carrier;
   a contact layer connected to the elastomeric lip and configured to sealingly contact the torque converter hub when the rigid carrier is positioned between the pump body member and the torque converter hub; wherein the contact layer is harder than the elastomeric lip to minimize friction at the torque converter hub;
   wherein the rigid carrier has an orifice positioned in fluid connection with the gap when the rigid carrier is positioned between the pump body member and the torque converter hub; and wherein the orifice is sized to control flow of fluid from the pump cavity through the gap to minimize pump pressure loss.

2. The seal assembly of claim 1, wherein the rigid carrier includes a first carrier member and a second carrier member; wherein the elastomeric lip extends from the first carrier member; and further comprising:
   a lip seal assembly including:
      a molded-over lip seal extending from the second carrier member at an axial distance from the elastomeric lip; and
      a biasing member retaining the lip seal in sealing contact with the torque converter hub at an axial distance form the elastomeric lip to define a seal cavity with the rigid carrier and the elastomeric lip; wherein fluid flowing through the orifice flows into the seal cavity; and
   wherein the first carrier member defines vent openings to allow fluid to empty the seal cavity.

3. The seal assembly of claim 1, wherein the contact layer is polytetrafluoroethylene.

4. The seal assembly of claim 1, further comprising:
   a seal member operatively connected with the rigid carrier and positioned to sealingly engage the pump body member when the rigid carrier is positioned with the lip seal in sealing contact with the torque converter hub, thereby further controlling fluid flow through the gap.

5. The seal assembly of claim 1, wherein the contact layer is integrally secured to the lip; and wherein the lip is integrally secured to the rigid carrier.

6. A seal assembly having:
   a rigid annular carrier;
   an annular elastomeric lip secured to the carrier and having a first hardness;

a contact layer secured on a radially-outer surface of the elastomeric lip and having a second hardness greater than the first hardness of the elastomeric lip;

an annular seal member operatively connected with the rigid carrier radially inward of the elastomeric lip;

wherein the carrier has an orifice positioned between the lip seal and the seal member to control fluid flow from a first side of the rigid carrier to an opposing second side of the rigid carrier; and wherein the rigid carrier has vent holes positioned adjacent the seal member opposite the orifice to permit venting of the oil that has flowed to the second side of the rigid carrier; the lip seal, the second sealing member, the orifice and the vent holes thereby maintaining fluid pressure on the first side of the rigid carrier.

7. The seal assembly of claim 6, wherein the seal member is one of a second elastomeric lip and an O-ring.

8. A torque converter assembly for a transmission, comprising:

a torque converter hub;

a pump powered by the torque converter hub to supply pressurized fluid to the transmission and having a pump body member;

a bushing adapted to fit between the torque converter hub and the pump body member to rotatably support the torque converter hub and sized to define a clearance gap between the pump body and the bushing to permit lubrication of the bushing by the pressurized fluid flowing through the gap;

a rigid carrier positioned between the pump body member and the torque converter hub;

an elastomeric lip extending from the rigid carrier;

a contact layer operatively connected to the elastomeric lip and configured to sealingly contact the torque converter hub; wherein the contact layer is characterized by a hardness greater than a hardness of the elastomeric lip to minimize friction at the torque converter hub; and wherein the rigid carrier has an orifice positioned in fluid communication with the gap; wherein substantially all fluid flowing from the pump cavity through the gap flows through the orifice; and wherein the orifice is sized to control flow of fluid from the pump through the gap to minimize pump pressure loss.

9. The seal assembly of claim 8, wherein the rigid carrier includes a first carrier member and a second carrier member; wherein the elastomeric lip extends from the first carrier member; and further comprising:

a lip seal assembly including:

a molded-over lip seal extending from the second carrier member at an axial distance from the elastomeric lip; and a biasing member retaining the lip seal in sealing contact with the torque converter hub at an axial distance form the elastomeric lip to define a seal cavity with the rigid carrier and the elastomeric lip; wherein fluid flowing through the orifice flows into the seal cavity; and wherein the first carrier member defines vent openings to allow fluid to empty the seal cavity.

10. The seal assembly of claim 8, wherein the contact layer is polytetrafluoroethylene.

11. The seal assembly of claim 8, further comprising:

a seal member operatively connected with the rigid carrier and positioned to sealingly engage the pump body member when the rigid carrier is positioned with the lip seal in sealing contact with the torque converter hub, thereby further controlling fluid flow through the gap.

12. The seal assembly of claim 8, wherein the contact layer is integrally secured to the lip; and wherein the lip is integrally secured to the rigid carrier.

* * * * *